US011854042B2

(12) United States Patent
Maggio (10) Patent No.: US 11,854,042 B2
(45) Date of Patent: Dec. 26, 2023

(54) SYSTEMS AND METHODS FOR PRESENTING SPLICE GAMES—RECONSTITUTED SPORTS PROGRAMMING— AND ENTICING FAN ENGAGEMENT

(71) Applicant: Frank S. Maggio, Pinellas Park, FL (US)

(72) Inventor: Frank S. Maggio, Pinellas Park, FL (US)

( * ) Notice: Subject to any disclaimer, the term of this patent is extended or adjusted under 35 U.S.C. 154(b) by 0 days.

(21) Appl. No.: 17/210,458

(22) Filed: Mar. 23, 2021

(65) Prior Publication Data

US 2021/0295377 A1 Sep. 23, 2021

Related U.S. Application Data

(60) Provisional application No. 62/993,698, filed on Mar. 23, 2020.

(51) Int. Cl.
*G06Q 30/02* (2023.01)
*G06Q 30/0242* (2023.01)

(52) U.S. Cl.
CPC ................ *G06Q 30/0245* (2013.01)

(58) Field of Classification Search
CPC .................................................. G06Q 30/0245
See application file for complete search history.

(56) References Cited

U.S. PATENT DOCUMENTS

| 9,740,776 | B2* | 8/2017 | Liang | G06F 3/0677 |
| 10,319,410 | B1* | 6/2019 | Townsend | G11B 27/30 |
| 11,012,757 | B1* | 5/2021 | Nielsen | H04N 21/812 |
| 2014/0108158 | A1* | 4/2014 | Athsani | G06Q 30/02 |
| | | | | 705/14.69 |
| 2014/0150004 | A1* | 5/2014 | Vemparala | H04N 21/44224 |
| | | | | 725/13 |
| 2015/0193814 | A1* | 7/2015 | Eppinger | G06Q 30/0277 |
| | | | | 705/14.41 |

OTHER PUBLICATIONS

Bo Yang et al. Online video recommendation based on multimodal fusion and relevance feedback. In Proceedings of the 6th ACM international conference on Image and video retrieval (CIVR '07). Association for Computing Machinery, New York, NY, USA, 73-80. https://doi.org/10.1145/1282280.1282290 (Year: 2007).*

\* cited by examiner

*Primary Examiner* — Waseem Ashraf
*Assistant Examiner* — Christopher C Busch
(74) *Attorney, Agent, or Firm* — TannerIP PLLC; Daniel A. Tanner, III; James E. Golladay, II (57) ABSTRACT

A system and method are disclosed for providing engaging, user-interactive advertising content, including rewarding users for engagement, based on a scheme for permissively reformatting archival copies of sporting events via, for example, splicing and resequencing sections of the archival copies, and re-presenting the content as a unique reconstituted sporting event, in an engaging manner that attracts mass audiences to engage the content with regard to the reconstituted event, and to further engage with the related advertising in a user-interactive manner.

12 Claims, 2 Drawing Sheets

SYSTEMS AND METHODS FOR PRESENTING SPLICE GAMES—RECONSTITUTED SPORTS PROGRAMMING— AND ENTICING FAN ENGAGEMENT

This application claims the benefit of U.S. Provisional Patent Application No. 62/993,698, entitled "Systems and Methods for Presenting Splice Games—Reconstituted Sports Programming—and Enticing Fan Engagement," filed on Mar. 23, 2020, the disclosure of which is hereby incorporated by reference herein in its entirety.

BACKGROUND

1. Field of the Disclosed Embodiments

This disclosure is directed to systems and methods for providing engaging, user-interactive advertising content, including rewarding users for engagement, based on a scheme for permissively reformatting archival copies of sporting events via, for example, splicing and resequencing sections of the archival copies, and re-presenting the content as a unique reconstituted sporting event, in an engaging manner that attracts mass audiences to engage the content, e.g., the event, and to further engage with the related advertising in a user-interactive manner.

2. Related Art

Globally, mass media advertising has evolved into a one trillion-dollar annual industry. Through advertising, brands and agencies attempt to convey information to consumers in a manner that creates interest in the advertised products, ideally in a powerful and repeated manner that is enough to drive consumer purchase and repurchase of specifically advertised goods and services.

Mass media advertising has likewise evolved from the nascent days of radio as the delivery medium through the emergence and expansion of television and individual interactive electronic media delivery platforms as the now-conventional and "preferred" media to reach the mass population across various demographics for entertainment, and advertising content delivery. The evolution continues. Over the last three generations, advertising-supported media has proliferated, and the amount and/or frequency of advertising has multiplied as the content delivery media has changed and evolved. Three network news and entertainment stations have evolved into dozens and dozens of news and entertainment and sports and advertising and other channels.

Today, there is an expanding trend toward reaching the consuming public via delivery of all manner of advertising-supported media to the personal electronic devices of individual users, including desktop, portable and/or tablet computers, mobile cellular telephones, and smart phones, and to other manner of configurable mass advertising, including fixed-location changeable electronic displays. Consumers, particularly those that carry, or are otherwise "tied to," one or more portable personal electronic devices, which now may include wearable input/output (I/O) devices, have become increasingly drawn to actively employing these portable personal electronic devices as the users' most prolific sources for all information intake, even in environments once primarily used for passively watching and focusing on television. Consumer portable personal electronic devices accompany the users at almost all times, providing the users with a capacity or ability, and an increasingly insatiable opportunity, to multi-task in each user's acquisition and sharing of information in a real-time user-involved or user-selectable information exchange experiences.

These real-time user-involved information exchange experiences include virtually all manner of electronically-enabled communication activities, such as, for example, engagement with social media, interactive electronic gaming (including group participation with other connected "garners") for active entertainment experiences, selection (including scheduled delivery) of particular media content for information delivery and passive entertainment experiences, and information exchange through email, messaging applications, and other forms of user-to-user (or user-to-a collective of users) communication.

Engagement, via the individual users' personal electronic devices, continues, and often dominates, even as the users are exposed to advertising presented on televisions and other more conventional fixed and semi-fixed means. Consumers have developed a near twitch-like response to multi-task, or "otherwise" engage, with their ever-present portable personal electronic devices when advertising, which is often considered disruptive, interrupts them, like an uninvited guest. In this manner, users tend to tune out the very content with which the advertiser intends for the user to be captivated.

A separate emerging trend with regard to user interaction through each user's portable personal electronic device is toward increasing user participation in a certain class of mobile applications that provide fantasy sports, wagering, or other forms of games with which a user, as a consumer of live, pre-recorded or virtual sports content presented on a "first screen," may engage using a "second screen." This second screen engagement may occur during commercial breaks, and extended engagement may lead to less consumption of the game broadcast and the advertising content within the broadcast on the first screen.

These advancing technologies can provide distractive sensory overload to a particular user/consumer. While providing the ability for users/consumers to do more, more often and at more locations, the inherently distractive nature of the second screen engagement may contribute to severely diminished advertising efficacy, for example, particularly with regard to advertising content delivered via traditional passive delivery channels.

Advertising content is just there, and is often discounted as the attention of the user/consumer is directed to other forms of "more important" personal interactive information exchange, and/or is "directed" based on the select information presented by the users portable personal electronic, and often voice interactive, device. It is thus harder to gain user/consumer attention to advertising, even during "live" programs such as sporting events and news content, while sound bites of interaction stream to and from the voice interactive portable personal electronic device. Engagement with the portable personal electronic devices, including smart phones, and with content-related applications, particularly through voice interactive engagement, deters or detracts/distracts from engagement with brands and the advertising content that has been so carefully formulated, and "market-tested," to encourage attention by, and engagement with, the consuming population.

Greatly diminished is the efficacy of the traditional advertising model, in which media, including conventional television networks, radio stations, newspapers and magazines, developed entertainment content of interest to users/consumers. The audience for the entertainment content was monitored and analyzed to demographically determine the interest of the users/consumers in order to target the audience in a manner that was intended to maximize the efficiency and the effectiveness of displayed advertising content presented at breaks in the entertainment content. Advertising costs were predicated on the size and demographic of the audience. The model, however, presumed a certain level of attention to the advertising content. That presumed level of attention is what has diminished as the ease of distraction for the user/consumer has so greatly increased. The "science" of ad placement thus needs to evolve with the changing engagement channels of the typical user/consumer.

Objectives of the producers/providers of goods and services, through their advertisers, remain to provide the users/consumers with advertising content that includes information on the goods and services in a manner that an increasingly distracted user/consumer will recall, and hopefully be intrigued by, and ultimately persuaded by, rather than typically ignoring and/or avoiding the content of the advertising as distracting or disruptive.

Against the backdrop of the above, the recent global phenomenon (pandemic) has caused extreme and unforeseen further disruption to the media model. Live sporting events were, for example, directly impacted, leading to cancelled events, and often to quarantining of fans that may have otherwise attended live games. Further detriment has been experienced by media properties with licenses to broadcast sports content, many of which must resort to broadcasting repeats of prior content including events and games, dating back years to as much as decades.

Fans of sports that hunger for engagement and competition. Live sporting event attendees who crave the somewhat tribal nature of mass participation of live sports, are typically not as inclined or motivated to watch a repeat of prior games, the "drama" and outcome of which are already known. As evidence, professional leagues in the United States, for example, for football and for basketball, and broadcasters of sports, were required to turn to repeat broadcasts during their network's off seasons, and as compared to their audience levels in-season, suffered significant declines in audiences, despite having hundreds, if not thousands, of prior game broadcasts at their disposal to choose from in re-presenting that content to their allegedly hungry consumer audiences.

During the off-season, and as evidenced in the current global event, league and broadcaster staff may experience reduced labor hours, and the equipment and skillsets related to video editing and broadcasting may be underutilized.

Some significant effort has recently been undertaken with regard to, for example, automobile racing in which a virtual racing format is being engaged in.

SUMMARY

It may be advantageous, in view of the above distractive nature generally imputed to one's portable personal electronic devices, and the challenges faced by leagues and media broadcasters when live sports are suspended or in the off-season, to find a manner by which to harness that distraction and interest in the adrenalized sensation of viewing or attending live sporting events. The lack of live sports, when replaced with prior archived sporting event broadcast, removes the anticipation and excitement of a game with an unknown, new and/or dramatic outcome. These archived games lack the thrill of an unknown outcome and make it difficult for viewers to "predict" an outcome (and where allowed, to wager on the outcome) as in many cases, the actual outcomes are easily accessible via commonly deployed search tools, and even printed works. While virtual sporting concepts may fill some of the gap, there remain opportunities for presenting sporting content in other unique ways that may incentivize users/consumers to engage not only with the sporting content, but also with the associated advertising content.

It may be advantageous to provide one or more systems and methods for implementing schemes that may allow owners of archived live or virtual sporting event content to present the content in a manner that may create new anticipation and excitement, even including allowing for an ability to wager on the outcome and the events within the sporting content. With such presentations, a user/consumer may also be engaged in a manner that tends to reduce the willingness on the part of the user/consumer to "tune out" the advertising content by changing the channel, walking away when the advertising content appears, or simply using the opportunity of the break in the entertainment content to separately immerse oneself more fully in the distraction provided by alternative media and second screen devices.

Exemplary embodiments of the systems and methods according to this disclosure may provide a comparatively cost-effective, entertaining, rewarding, and effective manner by which to deliver archived ("repeat") live or virtual sporting event content and current or archival advertising content to an audience of users/consumers with a scheme that attracts live viewing audiences, in an excited state, and that directly proves and measures user/consumer attention to and interaction with the live "featured" content and advertising content while collecting information on user/consumers in an unobtrusive, fun and potentially rewarding manner.

Exemplary embodiments may transform repeat live or virtual sporting content into a drawing card that attracts the attention of the users/consumers in a way that allows the users/consumers to interact with the content in the manner to which they have become accustomed with live, linear sporting content.

Exemplary embodiments may transform advertising related to the repeat content from something users/consumers avoid to a drawing card that attracts the attention of the users/consumers in a way that allows the users/consumers to interact with the advertising content in the manner to which they have become accustomed with live, linear sporting content.

Objectives of the disclosed schemes, as implemented in exemplary embodiments of the disclosed systems and methods, may include increasing active and interactive viewership in the repeat live or virtual sporting event and the associated advertising content, advancing user/consumer entertainment by making the repeat live or virtual sporting content at least as attractive as traditional live or virtual sporting content, while making advertising content less distractive, and promoting advertising immersion through willingness of the user/consumer to engage with the featured and advertising content in an incentivized, interactive and rewarding manner.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems, schemes, devices and methods for providing engaging, user-interactive advertising content, including rewarding users for engagement, based on a scheme for permissively reformatting archival copies of sporting events via, for example, splicing and resequencing sections of the archival copies, and re-presenting the content as a unique reconstituted sporting event, in an engaging manner that attracts mass audiences to engage the content, e.g., the event, and to further engage with the related advertising in a user-interactive manner, will be described, in detail, with reference to the following drawings, in which.

DETAILED DESCRIPTION OF EMBODIMENTS

The disclosed systems and methods may implement a scheme where owners or others in possession of archival live or virtual sports and sporting event content may repurpose it as repeat sports content by editing the archived content into sections of time (referred to throughout this disclosure as a "splice" or "splices") and then reassembling the splices from other similar repeat sports events, essentially reconstituting the repeat content into a new event, which may be referred to as a "Splice Game."

By way of example, a copy of a prior live basketball game, may contain four (4) quarters of twelve (12) minutes each. Each quarter may be left intact as a splice, or each quarter may be spliced into multiple shorter segments, for example, two six-minute segments. For purposes of illustration, the splice of the first half of the first quarter of a game that took place on a particular date [DATE 1] between Team X and Team Y, may be denoted as Q1A-XY-[DATE 1] (denoting quarter number and section, teams, and date), and the second half of the first quarter splice may be denoted as Q1B-XY-[DATE 1]. Each quarter may be similarly denoted.

In another instance (for example, game between the same two teams), later in the year, for example on another date [DATE 2], the broadcast might be similarly spliced into 8 splices, dividing each quarter into two 6-minute increments.

These two archive games could be used to reconstitute a new Splice Game, using splices from both repeat games. By way example, these two games may have two variations of each splice segment, meaning that there may be as many as $2^8$ (or 256) versions of the game (including 2 versions that remain identical to the original archived game).

The number of unique Splice Games between multi-year rivalries is virtually unlimited. For example, two rival professional football teams (for example, one from New England and one from Miami), have played each other twice a year for decades. Since 2000, through the end of the 2019 season, the teams have played each other 40 times. Splicing each quarter into half, netting 8 splices per archive game, may create as many as $40^8$ unique Splice Games from the 40 game rivalry—a staggering 6.553+ TRILLION games. By way of comparison, the planet Earth is estimated to be 4.543 billion years old, or approximately 6.523 trillion seconds old. Said another way, if every version of the 60-minute, 40-game rivalry series were to be sped up and presented in only one second, and starting from the beginning of time on Earth to today, there may still be 30 billion Splice Games yet to be presented.

Distributors of Splice Games may also create a live event around the creations and presentation of a Splice Game, whereby the Splice Game's splices are not revealed, or may be layered in and spliced in real time, under the control of myriad parties, such as the content distributor, an in-studio and/or home audience, and/or hosts that might compete with one another in view of the audience, for the right to select and splice segments of game play.

The presentation of the Splice Games thereby may become itself a new form of content that may attract a sports-friendly audience seeking new forms of sports entertainment. The disclosed systems and methods may implement an interactive user/consumer reactive and/or transactive scheme in which passive data delivery devices such as, for example, televisions and/or other public or private display screens, deliver content to users/consumers data exchange environment including one or more user/consumer personal portable electronic devices in order to confirm user/consumer attention to the content delivered from the passive data delivery devices. The disclosed schemes may particularly describe a capacity by which user/consumer data content and advertising data content delivery, and user/consumer attention to data content regardless of the delivery medium is measurable.

Exemplary embodiments may solve the above-indicated shortfalls in earlier systems, methods, techniques and schemes by providing a cost-effective, entertaining, rewarding, and operative way to present repeat live or virtual sporting event content and relevant advertising content to an audience of users/consumers across a broad spectrum of data delivery devices.

Exemplary embodiments may thus transform repeat live or virtual sporting event content and embedded or otherwise related advertising content from something users/consumers avoid to a fun, simple user-interactive game that may tend to attract the attention of the users/consumers to the repeat live or virtual sporting event content and advertising content with an added advantage of presenting users/consumers with an opportunity to be awarded prizes of varying value to stimulate interest.

The disclosed combinations of features may increase user/consumer viewership of the entire content stream, user/consumer entertainment, and user/consumer advertising immersion. When compared to traditional mass media advertising, exemplary embodiments may deliver advertising content that causes the users/consumers to fully immerse themselves in the advertising content. Immersion may manifest itself as a heightened attention level that causes the users/consumers to remember, and be otherwise persuaded by, the advertising content.

Immersion is the highest, most effective, and valuable attention level. Immersion helps advertisers achieve a maximized share of the user/consumer attention for the advertisers' content, typically describing and showcasing its goods and services as products. Advertisers' products may thus be remembered easier and faster than competing products. Immersion may be enhanced by several methods. First, immersion may be enhanced when the advertising content triggers an immediate emotional response within the user's or consumer's brain, such as via a warning or alert signal that is deliverable through the interactive I/O device associated with the user's or consumer's portable personal electronic device. The signal may alert the user/consumer to pay attention to the particularly-presented advertising content that follows the signal and may increase a likelihood that a user/consumer will remember/recall the advertising content when specifically queried.

When users/consumers are provided an opportunity to interact with the repeat live or virtual sporting event and advertising content via the user interactive I/O devices (i.e., in the manner typically employed by the users/consumers), as opposed to passively viewing or hearing the repeat live or virtual sporting event or advertising content, the users/consumers may be more likely to be attracted to the repeat live or virtual sporting event content and to remember/recall the advertising content.

In this manner, the disclosed systems and methods may implement an interactive user/consumer reactive and/or transactive content delivery and engagement scheme in which passive data delivery devices such as, for example, televisions and/or other public or private display screens, deliver content to the data exchange environments of the users and/or consumers, including through one or more user/consumer personal portable electronic devices, in order to confirm user/consumer attention to the content delivered from the passive data delivery devices.

The disclosed schemes may particularly describe a capacity by which user/consumer attention to data content regardless of the delivery medium may be measurable.

According to the current scheme, while engaging the described techniques and/or processes, users/consumers may have their usage data, engagement behaviors, and content (words, photos, thoughts, and personalities) collected and used to the benefit of the advertisers, often in a form of modifying, or presenting "better" or more targeted, advertising content. User/consumer data may be exchanged (sometimes sold, albeit that such tactics are gaining increasing public disdain), aggregated, and melded, allowing advertisers and other content delivery companies to triangulate portions of supposedly "anonymized" data to a point where individual users may be identified.

Exemplary embodiments may be directed at attempting to ensure that a balance is struck between individual user/consumer privacy concerns, and limitations on data sharing, with the exigencies of an increasingly animated and competitive retail marketplace. Advertisers may employ the disclosed systems and methods to make users/consumers comfortable with sharing information in an immersive data exchange environment, and ultimately the protection of that shared information. Put another way, the disclosed systems and methods seek to ease certain known tensions in the tug-of-war between individual privacy concerns and individual data rights, and the capacity of today's data-gathering systems to collect and analyze a wealth of individualized data for use between all constituents (retailers, marketers, consumer packaged goods (or CPG) companies, research and analytics companies, and the users/consumers themselves).

In embodiments, a series of queries related to the repeat live or virtual sporting event content and advertising content may be presented to the user/consumer via one or more devices, by which the user/consumer may interact with the disclosed systems, methods and/or schemes. In embodiments, the use of such a series of queries may provide, for example, a form of a memorization or comprehension challenge, or a request that may tend to attract competitive sports fans, and also increase immersion of the user/consumer in the advertising content by testing an ability of the user/consumer to recall certain specific details of the advertising content. Responding to the audible or visual alert signal may, after time, engender a pseudo-Pavlovian response by the user/consumer to "alerted" advertising content. Extended exposure to advertising content over time and/or to a longer effective advertising content length of presentation may tend to increase a likelihood of the desired level of advertising content immersion.

The disclosed systems and methods seek to reduce the intrusive nature, or "feel," of conventional advertising content, whether current or archival, while adrenalizing the audience with an exciting means of viewing splices of repeat (or reconstituted) sports content, presented in a novel and rewarding way. An objective of the disclosed schemes may be to attract incremental audiences to repeat live or virtual sporting event content while also reducing or effectively eliminating "ad skipping," which has become very commonplace.

The disclosed systems and methods may advantageously affect user/consumer behavior by alerting users/consumers to the presence of particularly-presented advertising content via I/O devices more commonly placed in the operating environments of the users/consumers, and rewarding the users/consumers for paying attention, in a measurable manner and according to a reportable scheme, to the advertising content.

The disclosed schemes implement a system or method by which consumer attention to particular advertising content is measured, while unintrusively collecting demographic and opinion feedback as a part of a new, honest, rewarding, and consumer-centric transactional relationship based on a data-driven multimedia, visual or voice interactive conversation between advertisers and users/consumers initiated in a manner that supplements the provision of passive advertising content to the users/consumers. Virtually instantaneous feedback may be obtained in a manner that does not require, for example, the advertiser to separately "burden" the user/consumer with an emailed survey to obtain the feedback from the user/consumer.

In embodiments, advertising content may be appropriately and/or properly packaged as a set of passive and interactive data inputs provided via all different forms of media. Live (immediate) interactive and/or reactive sessions may be commenced based on provision of an alert, and a user/consumer response to that alert. The sessions may continue with user/consumer attention to the advertising content, user/consumer presentation of a series of questions regarding the "just viewed" or "just consumed" advertising content, collection of user/consumer responses to the series of questions, and evaluation of those responses to determine user/consumer attention to the advertising content. Prizes may be directly or randomly awarded to various one of the users/consumers based on a measured result of this simple interaction.

It is recognized that there are many online firms that have, with varying degrees of success, attempted to merge some behavioral data with transactional data. It is postulated that the types of user/consumer interaction according to the disclosed schemes may easily eclipse all of those sorts of legacy efforts by providing a much more user/consumer interactive "friendly" exchange with the possibility of prizes being awarded at the end. In this regard, earlier legacy efforts, which may have proven only limitedly successful by maintaining an impersonal relationship between the retailers, and their vendor partners, and the consuming population that they are attempting to address, some may say cajole or otherwise manipulate, may be overshadowed by these simpler, more user/consumer friendly attention-incentivized methods.

The disclosed systems and methods are intended to better harness the tremendous capabilities of the data aggregation companies or data aggregators, which are currently unable to fully exploit their massive databases of transactional information, due to, among other things: a) their lack of ownership of census-level demographic information; and b) competitive concerns on the part of their merchant partners. A key to value and long-term viability for the data aggregators as service providers is to develop relationships with the agencies, and more importantly, the body of users/consumers—not just with a partial panel or subset of existing transactions.

It should be recognized that a first challenge exists in bringing a new (or renewed) value to the retailers, and a second challenge exists in any capacity to exchange this new value for access to the user/consumer information, and the right to leverage that information in a manner that provides value back to the user/consumer in a trusted environment. In exchange for better service for the users/consumers, access to consumers' transactions may be provided in a non-threatening and trusted manner. In this endeavor, a challenge exists in finding new uses for existing hardware and distribution channels, particularly where efforts may be directed at accessing the technology deployed by others (such as mobile phone service providers or social network infrastructures) to complement existing services and hardware deployment. This is particularly true in the disclosed capacity to leverage the latest I/O devices and interactive technologies in a manner that is intended to make users/consumers comfortable with the level of data exchange they may be asked to provide ultimately to the data aggregators and on to the retailers at large.

Figure 1:
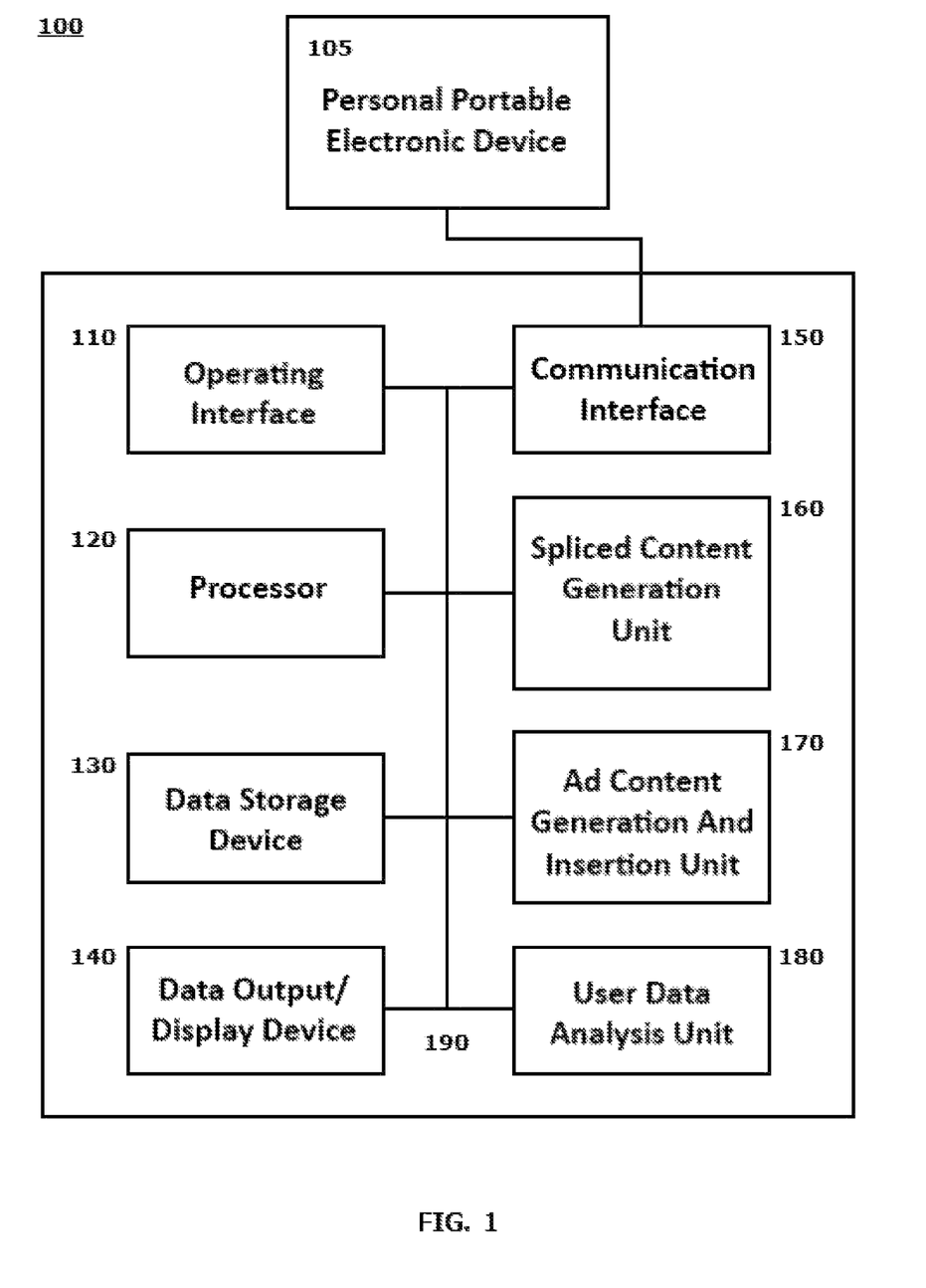
FIG. 1 illustrates a block diagram of an exemplary system for implementing the splicing and resequencing sections of archival copies, and re-presenting the content as a unique reconstituted sporting event according to the varied schemes outlined in detail below in this disclosure.

FIG. 1 illustrates a block diagram of an exemplary system for implementing the splicing and resequencing sections of archival copies, and re-presenting the content as a unique reconstituted sporting event according to the varied schemes outlined in this disclosure.

The exemplary system 100 may include an operating interface 110 by which a host or administrator may communicate with the exemplary system 100. The operating interface 110 may provide the host or administrator an opportunity to initiate a spliced content generation scheme, and to input any parameters appropriate to the conduct and/or control of end-user interactions with new entertainment content and/or selected advertising content according to the disclosed schemes outlined above and described in more detail below, including any parameters for collection and/or aggregation responses from end-users and end-user identifying and/or demographic information, including but not limited to responses to generated questions, inquiries or queries received from a plurality of end-users via communication with individual end-user personal portable electronic devices 105. Measured end-user interaction may be received from a plurality of individual end-user personal portable electronic devices 105 via, for example, an external communication interface 150.

It should be noted that the end-user personal portable electronic devices 105 may be any personal electronic device employed by an end-user such as, for example, desktop, portable and/or tablet computers, mobile cellular telephones, and smart phones, which now may include wearable input/output (I/O) devices whereby the end-user may be alerted to pending selected advertising content to which the end-user's attention may be directed, view spliced presented entertainment content and selected advertising content on a display screen, be presented with certain questions, inquiries or queries regarding the presented selected advertising content, and via the voice-interactive user interface, or otherwise via the personal portable electronic device 105, provide certain responses to the questions, inquiries or queries.

The operating interface 110 may be configured as one or more conventional mechanisms common to computing and/or communication devices that may permit the host or administrator to input information to the exemplary system 100. The operating interface 110 may include, for example, a conventional keyboard, a touchscreen with "soft" buttons or with various components for use with a compatible stylus, a microphone by which the host may provide oral commands to the exemplary system 100 to be "translated" by a voice recognition program, or other like device, including any emerging wearable I/O device, by which an individual may communicate specific operating instructions and predetermined parameters setting to the exemplary system 100.

The exemplary system 100 may include one or more local processors 120 for individually operating the exemplary system 100 and for carrying into effect the disclosed schemes in the exemplary system 100. The processor 120 may carry out routines appropriate to operation of the exemplary system 100, and may undertake data manipulation and analysis functions appropriate to the implementation of the scheme of spliced content generation, entertainment and advertising content display, end-user information and/or response collection and end-user metrics analysis according to the disclosed schemes. Processor(s) 120 may include at least one conventional processor or microprocessor that interprets and executes instructions to direct specific functioning of the exemplary system 100, and control of the automated schemes in any of the disclosed variations.

The exemplary system 100 may include one or more data storage devices 130. Such data storage device(s) 130 may be used to store data, including archived entertainment content, new entertainment content, selected advertising content, collected information and/or data from end-users, or operating programs to be used by the exemplary system 100, and specifically the processor(s) 120 in carrying into effect the various schemes. At least one of the data storage device(s) 130 may be used to store the end-user identification and demographic data, and/or measured advertising attention metrics based on an analysis scheme regarding user data as undertaken by a user data analysis unit 180. The end-user identification and demographic data may be received from the plurality of end-user personal portable electronic devices 105, such data being usable to identify individual end-user entertainment content and/or advertising content preferences, priorities, and/or accessibility to the disclosed schemes implemented by the exemplary system 100 according to use of a particular personal portable electronic device 105.

The data storage device(s) 130 may include a random access memory (RAM) or another type of dynamic storage device that is capable of storing updatable database information, and for separately storing instructions for execution of system operations by, for example, processor(s) 120. Data storage device(s) 130 may also include a read-only memory (ROM), which may include a conventional ROM device or another type of static storage device that stores static information and instructions for processor(s) 120. Further, the data storage device(s) 120 may be integral to the exemplary system 100, or may be provided external to, and in wired or wireless communication with, the exemplary system 100, including as cloud-based storage components.

The exemplary system 100 may include at least one data output/display device 140, which may be configured as one or more conventional mechanisms that output information to a user locally as the host or administrator, on a progress of the implemented scheme, and interaction with individual end-users via their personal portable electronic devices 105, and/or the conduct of the spliced content generation scheme and the entertainment/advertising content display and data collection scheme implemented by the exemplary system 100. The data output/display device 140 may be used to indicate to the host or administrator information regarding a compilation of the data received from the plurality of end-user personal portable electronic devices 105. It is not necessary that the host or administrator monitor the actual conduct of the automated scheme executed by the exemplary system 100, but the host or administrator is afforded that option via one or more data output/display device(s) 140. Further, the data output/display device 140 may be in the form of a printer or other data delivery means by which, for example, reports may be generated to be later reviewed by the host or administrator.

The exemplary system 100 may include one or more separate external communication interfaces 150 by which the exemplary system 100 may communicate with one or more of a plurality of end-user personal portable electronic devices 105 via which participating in-users may choose to engage with exemplary system 100 executing the scheme by which, for example, spliced entertainment and advertising content is presented to the end-user, questions/inquiries/queries regarding the advertising content are then presented to the end-user, and responses to the presented question/inquiries/queries are collected from the end-users via their personal portable electronic devices 105. Communication between the external communication interface 150 and the one or more of the plurality of the end-users' personal portable electronic devices 105 will typically be via wireless communication with the exemplary system 100, but this need not necessarily be the case where, for example, a particular local headset as a voice-interactive user interface may be plugged into the exemplary system 100. It is anticipated that components of the exemplary system 100 may communicate with a broad spectrum of end-user personal portable electronic devices 105 that may generally be employed by each end-user in executing engagement with the scheme implemented by the exemplary system 100.

The exemplary system 100 may include a spliced content generation unit 160 that may be used to generate new entertainment content from archived entertainment content stored in one or more of the data storage devices 130. The new entertainment content may be generated by parsing the archived entertainment content into segments and combining some segments of the archived entertainment content in a manner that produces new entertainment content as a different entertainment content from the archived entertainment content as it was stored in the one or more data storage devices 130.

The exemplary system 100 may include an ad content generation and insertion unit 170, which may be usable to select and insert particular advertising content into the new entertainment content generated by the spliced content generation unit 160. In this manner, combined entertainment content and selected advertising content is combined in a manner that is intended to be displayed to the end-users. The ad content generation and insertion unit 170 may be usable to coincidentally generate and forward questions/inquiries/queries related to presented selected advertising content with which the question/inquiries/queries may be associated in implementing the scheme according to this disclosure. The question/inquiries/queries may be drawn from a database stored in one or more the data storage devices 130.

The exemplary system 100 may include a user data analysis unit 180 that may be used to collect and aggregate end-user responses and information received by the exemplary system 100 from the end-users via their personal portable electronic devices 105. The user data analysis unit may be usable to analyze, and/or otherwise score end-user responses to the presented question/inquiries/queries related to the presented selected advertising content as received from the plurality of end-user personal portable electronic devices 105.

The user data analysis unit 180 may be separately usable to perform analysis and incentives generation functions by which, when a particular end-user participating in engagement with the scheme implemented by the exemplary system 100 by communicating responses to individual questions/inquiries/queries, and certain identifying information for the user/consumer, is determined to have participated enough to trigger the winning of a prize, award, reward or the like, according to a pre-determined scheme, the prize, award, reward or the like being in a form of, for example, merchandise, discounts, coupons, cash and/or other incentives, that selection may occur based on an aggregated score for the "correctness" of responses to those questions/inquiries/queries related to the selected advertising content received from the end-user, at which time the end-user may be notified by having a particular message formatted by the user data analysis unit 180 and transmitted to the one of the plurality of personal portable electronic devices 105 controlled by the particular end-user via the external communication interface 150.

It should be noted that any of the spliced content generation unit 160, the ad content generation and insertion unit 170 and the user data analysis unit 180, or any combination thereof, may be functions of the processor 120, or may exist in the exemplary system 100 as stand-alone components.

The exemplary system 100 may communicate with one or more of a plurality of personal portable electronic devices 105, each of which may itself include a separate user interface, processor, communication interface, memory, and display device. The end-user as an actor or a player participant in the disclosed scheme implemented by the exemplary system 100 may employ her or his personal portable electronic device 105 for interaction with the exemplary system 100 as it carries into effect the disclosed schemes for implementing the disclosed schemes for spliced content generation, and content insertion, and end-user information interaction.

All of the various components of the exemplary system 100, as depicted in FIG. 1, may be connected internally, and to one or more external components by one or more data/control busses 190. These data/control busses 190 may provide wired or wireless communication between the various components of the exemplary system 100, whether all of the components of the exemplary system 100 are housed integrally in, or are otherwise external and connected to, the exemplary system 100.

It should be appreciated that, although depicted in FIG. 1 as an essentially integral unit, the various disclosed elements of the exemplary system 100 may be arranged in any combination of sub-systems as individual components or combinations of components, integral to a single unit, or external to, and in wired or wireless communication with the single unit of the exemplary system 100. Wireless communications may be by RF radio devices, optical interfaces, NFC devices and other wireless communicating devices according to RF, Wi-Fi, WiGig and other like communications protocols. In other words, no specific configuration as an integral unit, or as a support unit, is to be implied by the depiction in FIG. 1. Further, although depicted as individual units for ease of understanding of the details provided in this disclosure regarding the exemplary interface and control system 100, it should be understood that the described functions of any of the individually-depicted components may be undertaken, for example, by one or more processors 120 connected to, and in communication with, one or more data storage device(s) 130.

Figure 2:
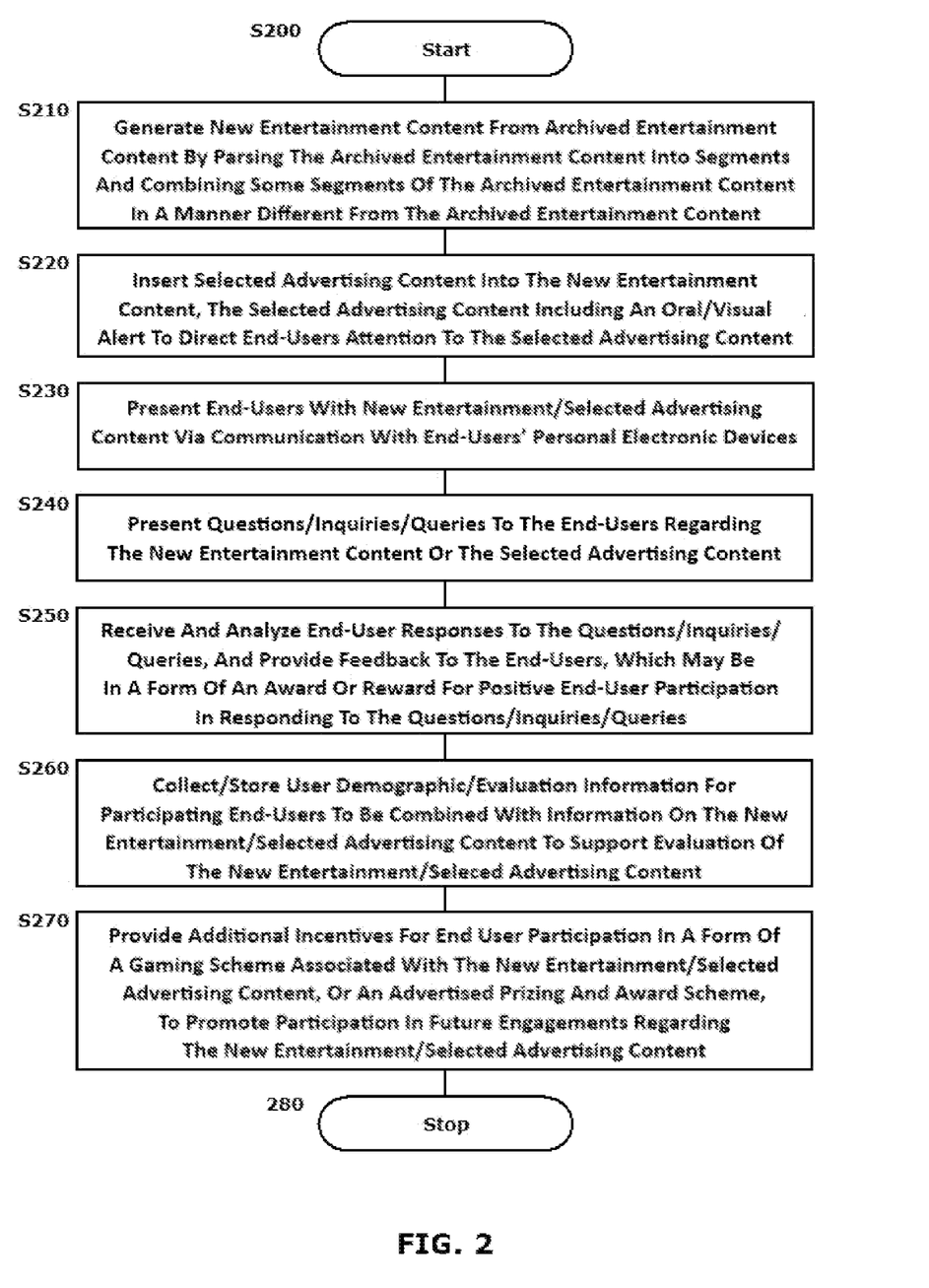
FIG. 2 illustrates a flowchart of an exemplary method for implementing the splicing and resequencing sections of the archival copies, and re-presenting the content as a unique reconstituted sporting event schemes according to this disclosure.

FIG. 2 illustrates a flowchart of an exemplary method for implementing the splicing and resequencing sections of the archival copies, and re-presenting the content as a unique reconstituted sporting event schemes according to this disclosure. Operation of the method commences at Step S200 and proceeds to Step S210.

In Step S210, new entertainment content may be generated from archived entertainment content in a scheme that parses the archived entertainment content stored in one or more data storage devices into segments. The parsed segments may then be combined, or "spliced," in an order different from the order in which the individual segments were presented in the original archived entertainment content in order to generate the new entertainment content. The individual segments from the archived entertainment content may be from a particular show or event, or may be drawn separately from a plurality of archived shows or events. Operation of the method proceeds to Step S220.

In Step S220, selected advertising content may be inserted into the new entertainment content in a manner that is then exportable to one or more end-user personal portable electronic devices for consumption by the end-user. In embodiments, the selected advertising content may include one or more of an aural or visual alert intended to alert end-users to pay particular attention to the selected advertising content in accordance with the disclosed schemes. Operation the method proceeds to Step S230.

In Step S230, a end-users may be presented with the combined new entertainment content and selected advertising content via communication with the end-users portable personal electronic devices. Operation of the method proceeds to Step S240.

In Step S240, end-users may be presented with one or more questions, inquiries, or queries regarding the new entertainment content or the selected advertising content. Such presentation is generally intended, according to the disclosed schemes, to provide end-users an opportunity to demonstrate attention to the one or more of the new entertainment content and the selected advertising content. Operation of the method proceeds to Step S250.

In Step S250, end-user responses to the questions, inquiries or queries may be received and analyzed. In embodiments, feedback may be provided to the end-users based on the receipt and analysis of the end-user responses. Such feedback may be in a form of an award or reward for positive end-user participation in responding to one or more of the questions, inquiries or queries demonstrating end-user attention to the particular details of the presented entertainment content or selected advertising content viewed by the end-user. Operation of the method proceeds to Step S260.

In Step S260, user demographic and/or of valuation information may be collected and stored for participating end-users to be combined with information on the new entertainment content and/or selected advertising content. This collected and/or stored to support evaluation of the new entertainment content and/or the selected advertising content. Operation of the method proceeds to Step S270.

In Step S270, additional incentives may be provided for end-user participation. Such incentives may be in a form of providing a gaming scheme or wagering scheme associated with the new entertainment content and/or the selected advertising content to which particular end-users attention has been directed. Separately, the additional incentives may take a form of collection of all positive evaluations of end-user responses over a particular period of time, or with respect to particularly-presented selected advertising content, which may then be collected and separately evaluated, or randomly selected from, to award more significant prizes from a prize pool according to a predetermined, and/or advertised, prizing and award distribution scheme. In embodiments, winners of more significant prizes from a prize pool according to the predetermined, and/or advertised, distribution scheme may be notified, their names and likenesses collected for display, and/or live award appearances of such winners of more significant prizes may be collected for later use to promote participation in future engagements regarding the new entertainment content and/or the selected advertising content in a manner that is designed to enhance end-user awareness of, and participation in, those future engagements. Operation of the method proceeds to Step S280, where operation of the method ceases.

As generally outlined above, the method depicted in FIG. 2 In embodiments, the disclosed systems and methods may implement a scheme to entice and/or incentivize end-users to view repeat live or virtual sporting content due to the manner in which it is reformatted and presented in a new fashion, with a unique outcome. This scheme may make the content more attractive, and the addition of gamification, including quizzes that test attention, while also allowing for prediction, for a chance to be rewarded with prizes and notoriety, may serve to attract a wider audience. Once engaged, the audience may be alerted to particularly-presented advertising content. The end-users may be afforded an opportunity, only for a limited amount of time in certain embodiments, to arrange to receive the new entertainment content and/or the selected advertising content passively or actively. This content may be displayed in a manner that is easily accessible to the end-user.

In embodiments the display may be provided separately by other means such as, for example, on television, via radio, via some digital display screen in any public venue (including airport concourses, or the myriad display screens typical at any public sporting event), or in virtually any other like manner.

In embodiments, at an appropriately calculated time following the presentation/display of the new entertainment content or the selected advertising content, end-users, that may have to be separately registered or pre-registered, may be presented with a series of questions, which may be presented in any manner, including via I/O devices and interactive technologies associated with any one or more of each end-user's personal portable electronic device. These questions (alternatively referred to throughout as queries) may quiz the end-user regarding particular details of the entertainment or advertising content. The end-user may, in embodiments, be provided a particular response time within which to respond in order that the responses are only informed by the particular details of the most recently viewed entertainment or advertising content, rather than what the end-user may be able to obtain given time and research resources. Responses may then be evaluated and immediate feedback may be provided to the end-user.

In embodiments, the disclosed alert-attention-interactive response-analysis-award/reward scheme may be particularly advantageously undertaken via the deployment of a gaming application that enables contesting of end-users with a set of pre-conditions, or between end-user audience members consuming the entertainment content and advertising content.

In embodiments, the disclosed schemes may provide a manner by which to collect, analyze and evaluate demographic and/or end-user habit information regarding particular attention to the distributed content, and certain individualized, perhaps targeted, advertising content by any one of a number of discrete discriminators including, for example, by time, by region, by content, by content display medium, by end-user device, or otherwise.

An information collection and storage system or device, as a component of the disclosed system or for implementing the disclosed methods, may be usable to collect, parse, analyze and store data gathered ultimately from the participating end-user devices. The stored data may be parsed appropriately into individual identifying data for each end-user and overall end-user population data. The individual identifying data for each end-user may be randomly updated to include registration information, response information, interaction information, entertainment consumption behavior, random winner selection information and other related information usable to particularly identify, target, and interact with individual end-users.

The disclosed system and its data storage devices may be intended to provide a secure repository for all end-user identifying information, which may include, but not be limited to, personal information, which may include the name, address, social security number (which typically be obtained only from prize winners for tax reporting purposes), other personal identification numbers, phone number, and identification of the devices (including the interactive I/O devices and personal portable electronic devices) employed by the identified end-user and other collectible information regarding, for example, the particular "shopping" or advertising content interaction, habits of the identified end-user.

The disclosed schemes may include a capability by which to determine effectiveness of advertising content, particular sets of end-user queries, accuracy of responses, and other information that may be usable to advertisers and/or entertainment content providers in modifying the advertising, or other, content provided to the end-users to be most effective in its delivery.

In embodiments, a registration process may be advertised by conventional legacy means to generate initial interest in the deployment of the reactive advertising content according to the disclosed schemes. Particular end-user data may be collected and stored in a database associated with the above-described information collection and data storage system, or otherwise.

As the concept of repurposed, re-segmented or spliced repeat live or virtual sporting event content, and advertising engagement, catches on publicly, and is itself advertised for its benefits, it is believed that interest in the disclosed schemes by advertisers and end-users alike may increase as each clamors to take advantage of the novel and exciting presentation approach and the tangible and intangible rewards provided by systems and methods implementing the disclosed schemes.

Regardless of the manner in which the system is alerted to participation by a particular end-user, evaluation of the answers provided by the end-user to the one or more queries may be undertaken for any evaluation purpose. According to embodiments of the disclosed scheme, prizes may be awarded directly or randomly to incentivize the current and future participation of an anticipatedly increasing population of users/consumers responding via myriad forms of interactive I/O devices.

It should be recognized that entities supporting various interactive I/O schemes may have an interest in determining participation via their proprietary devices and schemes and may modify their approaches as well to capture a greater percentage share of the participating end-user population.

In embodiments, the disclosed systems and methods may implement schemes that accommodate multiple variables specifically in information and data collection activities. Accounting may be had for anticipated traffic and geographic/time zone requirements. Differing data collection and storage restrictions attributable to differing domestic and international jurisdictions may also be accounted for.

In embodiments, selection criteria for winners of awards/rewards, and distribution of prizes/prize pools, may be reserved to the providers of the entertainment and/or advertising content. The I/O device service providers may work independently, or in concert with the entertainment and advertising content providers, to establish ways to further incentivize use of their particular products.

The entertainment or advertising content provider, the involved I/O device service provider, or a third party service provider (in the context of an offer fulfillment services provider, for example), may add a step of contacting potential (or contingent) award/reward winners to verify identities of, and/or the truthfulness of a potential (or contingent) winners' registration and response information. If this option is used, the provider may verify the identity by authenticating the registration and response information of the end-user identified or selected as the potential (or contingent) award/reward winner. The provider may require potential (or contingent) winners to verify demographic or confidential data prior to awarding prizes. For example, a provider may repeat one or more questions in the query, and may elect to disqualify potential (or contingent) award/reward winners who fail to provide responses that match their previous responses.

In embodiments, as indicated broadly above, interaction and prediction elements may include enabling consumers to wager payments or other forms of rewards, points or items of value, when predicting the results of statistical outcome of the entertainment content and its presentation. Embodiments may include a variety or combination of formatted or random predictions, prop bets, attention, retention or comprehension quizzes, and trivia related to the entertainment content such as for virtual sporting events, players, teams, hosts or competing presenters of the spliced entertainment content.

In embodiments, one or more splices may be a virtual or video game competition between representatives of respective teams, or an eSports athlete, with the results of the virtual or video game splice being incorporated into the spliced content or game in a like manner to incorporation of a spliced entertainment segment.

A net result of such a "Splice Game" process may be a reconstituted game with its own statistics (score, shots, etc.) based on the unique combination of splices. For basketball, for example, a combination of eight half quarter splices may create a full-length game with its own unique outcome. If the outcome is a tie in regulation, the game may continue with a splice from another game, or an overtime of another game, which itself could be spliced. Alternatively, some other tie breaker may be used, or a tie may be allowed to remain.

In embodiments, archived footage of sporting events may include an overlay that supersedes and covers the scoreboard and stats of the archived footage, so that after the first splice (or even during the first splice), a new scoreboard may be provided to track the spliced score and stats.

As to sound, a spliced sporting event may, for example, contain the prior voice over work with references to scores muted, bleeped, or overlaid with dubs of the in-progress Splice Game score. Alternatively, the network or Splice Game producers may create a new voice over a portion or all of the game referencing the score according to the in-progress action.

In embodiments serving splice events with potential continuity issues (e.g., sports that focus on individual players such as golf, tennis, fighting, and racers/drivers that may result in the individual or team not being a participant in all prior sporting events to be spliced), alternative methods of splicing may allow for interesting Splice Game outcomes. Such methods might include, but not be limited to, clustering individuals into teams (e.g., a foursome of players, or the best outcome of one or more players, such as a best-ball version for golf), sponsors or sponsor categories (e.g., for professional stock car racing, one home improvement store sponsor may square off against another home improvement store sponsor, beer sponsored cars may square off against soft drink sponsored cars), team numbers or cluster of numbers (e.g., all cars ending in a "1" or ending in any other specified number combinations), or for sports like golf, splicing hole numbers from various events (e.g., selecting the best first hole performances from a series of golf outings, from which a certain golfer may have played). Those familiar with sports genres that may contend with continuity issues may recognize myriad methods by which a Splice Game may be spliced in order to provide an interesting and viewable outcome in the aggregate.

The audience may watch Splice Games and be incentivized to engage with the broadcast via a second screen game or application ("app"). The sync-to-event app may allow audience members (via visual, audio, or other multi-media platforms) to predict an outcome of the Splice Game or events in the Splice Game, answer attention-verifying questions about the game, trivia about the sport, game, history, and the like, and questions about the ads in the broadcast of the Splice Game, the sync-to-event app, or both. Quiz questions may verify attention to the Splice Game, the hosts and their on-screen actions, the sponsors, and any content covered in the broadcast, and the sync-to-event app may invite and reward consistent live viewing of the Splice Game broadcast A score-matching component may be replaced with an alternate stat matching component, or may instead be matched to other measurements of events (such as frequency that an announcer uses a word, or even matched to the number of players playing the sync-to-event app, or the like).

In embodiments, sync-to-event app games could have "game breaks" at pre-determined intervals or actions in the entertainment content (e.g., scoring after each quarter of play) where quiz questions and score/stat matching may occur. In-game questions may be posed, as may prop bets that ask questions that may or may not be easily researched by players seeking to gain an advantage. Details of answers to questions may be provided on sponsored pages or in sections of the sync-to-event app or on related content web sites, which may reward visitors for spending time reviewing details supported by sponsors.

The audience may predict the outcome of the Splice Game prior to its commencement, or potentially with declining weight later into the game (with less points awarded the later the prediction is made). Predictive questions may be used to break ties between players, or related tie-breaker points may be added to the app game score to break ties.

In embodiments, predictive questions may yield points added to the app game score, and a second tie-breaker with points NOT added to the app game score, may be used to break ties that still exist. These "tie-breaker tie-breakers" may also be predictive, skills based, based on chance, or according to some combination.

In embodiments, the sync-to-event app may be enabled to deal a virtual poker hand to players after each game break, that may create a hand value that may break ties, further appealing to a large segment of the viewing audience that enjoys playing poker. By way of example, the app game may contain game breaks for player participation (pre-game, and end of each quarter and game). In the event a player misses a game break at the end of a quarter, the player may not receive a card, placing them at a disadvantage. In embodiments, at the end of the Splice Game, if there are any ties, the poker hands of each player may be compared to break ties.

By way of example, an increasing point value may be applied to higher ranked poker hands, and also card point values may be assigned based on the value of the cards (and suits of those cards). A player may, over 5 game breaks, for example, be dealt three of a kind, which may be worth 300 points, and the five cards may be 8C, 8D, 8S, 4H, KH (Clubs, Diamonds, Hearts and Spades), where cards are attributed a point value (8=8, King=13, and so on based on their hierarchy), and then a lesser point value might be added (e.g., 0.1 points) based on a suit hierarchy (e.g., alphabetic order as in bridge, so a club is attributed no premium as the lowest suit, with a diamond attributed a 0.1 premium, a heart a 0.2 premium, and a spade a 0.3 premium). In this example, the tie-breaker score may be:

Hand Value: 300
Card Value: 8+8+8+4+13=41
Suit bonus: 0+0.1+0.3+0.2+0.2=0.8
TOTAL: 341.8

The 341.8 tie-breaker value may be compared against players that are similarly tied, allowing for the highest score of tied players to be broken by awarding the win to the highest poker hand valuation.

In embodiments, in order to add an element of skill, after the third card is dealt, a player may opt to "fold" and retain 200 hand points plus their card and suit count values over the balance of five game breaks, as opposed to continuing to build a hand and risk scoring less hand points.

In embodiments, the audience participants may vote for subsequent splices, with choices being offered via the sync-to-event app, the league or broadcaster, other parties, or some combination thereof. The ability of the audience or a segment of the audience to help direct the outcome of the Splice Game may be tied to leaderboards of fans that may be in various clusters (e.g., states of residence, team-specific fan bases, or paired with one of the on-screen hosts). The broadcast network may pre-select the splices as opposed to allowing any single individual to dictate an outcome, which may also allow for preparation of overlays and voice over for a more professionally-produced product.

In embodiments, the broadcast network may invite or compensate players or coaches of current or past teams to host the spliced game on-air, potentially in real time (or via tape-delay), and pit these hosts against one another in a "Splice Battle" by playing a different or similar version of the sync-to-event app being played by the audience. The leading host after a splice (e.g., with the highest score in the app game, or the host whose selected or associated team with the higher score in the Splice Game) may select the next splice, allowing the host to select a splice where the host's on-screen team may have knowingly performed better than the opposing team, advancing the score or stats of the Splice Game in favor of the host or players in control of the selection process.

In embodiments, audience members may, via a special code provided on-screen or elsewhere, play with or against the hosts, creating a version of, for example, a VIP leaderboard of all users who may use the same VIP code. Top scoring players associated with the leading host may be empowered to vote for the next splice (from a multiple-choice question, for example), with the splice garnering the most votes being selected.

The on-screen hosts may be motivated to win, for personal gain or for the prestige of their team. The hosts may be enabled to access data related to their arsenal of splices, and strategically select splices that favor their team.

In embodiments, a unique splice may be limited to being used once per broadcast, tournament, or over a series of broadcasts, or may be forever retired. By way of example, a network may host a best of five tournament between two professional teams, over multiple evenings, and competing on-screen hosts may abide by rules regarding the universe of splices available for selection. Rules governing hosts may include authorization to only choosing matching splices in time (e.g., a second half of a first quarter must be from another second half of a first quarter). Limitations of available splices may alternatively include selecting a limit of one splice per playoff series, season, or other limitations that may enhance entertainment value.

Hosts may be enabled to override splice selections by an opposing host or may use game mechanics such as shields or power-ups to erase results for a segment of time in the future, or having just occurred. By way of example, a host may have an equivalent of a "red flag" that football coaches have to stop play and have a review, where the host may throw a flag or otherwise initiate a pause in the Splice Game, such that myriad options may be presented to the host. The host may question a penalty that occurred in the archived splice, that may have been incorrectly ruled, and a new ruling may occur to override the event or reverse a score. A host may throw a "60 Second Eraser" flag or card, that may nullify the points (or a portion of points, or types of scores) that occurred in the prior 60 seconds of game play (or the upcoming 60 seconds of game play). A competing host may also have a "neutralizing" flag (in embodiments, with quantity limitations, such as only one per game) to neutralize an "Eraser" flag, overrule a splice selection, or reverse or otherwise alter actions taken by a competing host, sporting event play, or the like.

In embodiments, including but not limited to where wagering may be applied, or where the universe of eligible splices may heavily favor one team over another, handicapping may be applied to "level the playing field." By way of example, one method of handicapping may include a score multiplier for one team, such as earning 105% of all points scores, or some form of score bonus (or subtraction) at the start or end of the Splice Game, or before, during or after a splice. The odds of a win in a Splice Game may be handicapped similarly to methods deployed by gaming companies, and myriad other means of handicapping may be deployed to provide for a closer finish and results for Splice Games at risk of having consistently one-sided outcomes.

In embodiments where game hosts may compete in Splice Battles, rules of their Splice Battle may provide for advantages such as increased or diminished powerups, an ability for one host to obtain access to a greater or lesser quantity of splices, or an ability to gain extra opportunities to select subsequent splices and control the outcome of the Splice Game.

The audience may similarly participate to augment or assist in these dramatic "game arch" moments, in order that the Splice Game outcome be impacted. Numerous other game mechanics may be deployed that may allow hosts, leagues, teams, and audience members to alter the course of the Splice Game. The power to do so for audience members, in exemplary embodiments, may be tied to frequency of play, points, winning record, or unique codes that may be available by visiting web sites or apps hosted by sponsors, leagues, networks, app developers, and the like, and then entered into the app game.

In embodiments, advertisers and sponsors may be associated with the Splice Games and/or sync-to-event app games in myriad ways, and their advertising may be incorporated via reactive ads (where gamified questions concerning in-app, broadcast, or other locations where ads may appear are posed, with points and/or prizes being awarded for correctly answering). A virtual scoreboard may be sponsored, while existing archived footage of brands appearing at stadiums or in archived footage, may be re-monetized, or visually covered by new sponsor information. The sync-to-event app game may serve questions about ads in any related environment and become part of the app game event. The on-air hosts may incorporate sponsors into their competing segments, by wearing jerseys, or mentioning the product or sponsors, and questions may be asked later in the app about these or similar details. Sponsors may also sponsor the myriad power up elements within Splice Battles.

Because Splice Games may use edited live or virtual splices, archived TV timeouts and ad insertions may be used or avoided, at the discretion of the Splice Game broadcaster. New ad insertions and sponsorships may be separately enabled.

Some professional sports leagues have off-season TV networks that struggle to provide interesting content during the off-season. The implementation of Splice Games to attract viewers to pay attention may provide an exciting new stream of potentially unlimited one-off content that may attract and retain consumers and fans after the regular season is completed.

Splice Games may also provide important solutions and timely content to offset losses from potential stoppages of play tied to strikes, pandemics, or other national, regional or local emergencies.

It should be noted that archived versions of the games may still be gamified to various extents in the manner discussed above, with splices being intermittently added to change only a segment of the archived live or virtual game. In an effort to avoid cheating and other misfeasance, predictive questions may, in embodiments, be tied to events that are not easily accessed via online databases, or archival video footage.

In embodiments, once a Splice Game is spliced and prepared for public viewing, a mass media broadcast network may provide the distribution mechanism for the Splice Game in, for example, a linear TV format, where the Splice Game program (consisting of splices of content) may be delivered via traditional broadcasting, and responses to the Splice Game interactivity (including wagering) may be via end-users personal portable electronic devices. The splicing of the Splice Game itself according to the disclosed scheme is unique and may be separate from how end-user may engage with the entertainment content.

In embodiments, wagering on an outcome of an event included in the entertainment content may be facilitates, without the addition of selective advertising. For example, a live Splice Battle may be presented as, for example, a pay-per-view event, or with the application of wagering, the Splice Battel may be distributed via broadcast or cable TV, with the wagering being facilitated by end-users via portable personal electronic devices.

In embodiments, a Splice Game may be broadcast with embedded traditional, non-reactive advertising and presented as pure entertainment, to mass audiences.

Although the above description may contain specific details, these details should be construed as illustrative and not construed as limiting the disclosure in any way. Other configurations of the described embodiments may be part of the scope of the disclosed embodiments. For example, the principles of the disclosed embodiments may be applied to each individual end-user that may independently access features of the disclosed archived live or virtual sporting event, other entertainment content, splicing schemes and presentations, reactive data exchange, verification and reward systems and/or schemes. This enables each end-user to use the benefits of the disclosed embodiments even if any one of a large number of possible applications do not need all of the described functionality. In other words, there may be multiple instances of the disclosed systems, methods, devices and schemes each being separately employed in various possible ways at the same time where the actions of one end-user do not necessarily affect actions of other end-users using separate/discrete embodiments.

I claim:

1. A system for analyzing and reporting user engagement with entertainment content, comprising:
   a display device that is configured to display spliced entertainment content;
   a storage device that is configured to store archived entertainment content, the spliced entertainment content and user engagement information;
   a content configuring device that is configured to generate the spliced entertainment content by:
      parsing portions of the archived entertainment content into a plurality of individual segments,
      reordering at least some of the plurality of individual segments in a second order that differs from a first order in which the at least some of the plurality of individual segments were presented in the archived entertainment content, and
      inserting additional content into the second order of the at least some of the plurality of individual segments;
   a user data collection and analysis device that is configured to collect, analyze and store user data collected from a plurality of users;
   a communication interface that is configured to:
      establish communication between the content configuring device and the display device to communicate the spliced entertainment content from the content configuring device for display on the display device, and
      establish communication with a plurality of user electronic devices by which one or more of the plurality of users communicates with the user data collection device to facilitate user interaction with the user data collection device; and
   an inquiry generating device that is configured to:
      generate inquiries related to the spliced entertainment content; and
      communicate the generated inquiries to the at least some of the plurality of user electronic devices via the communication interface,
   wherein the user data collection and analysis device:
      collects user information comprising (a) identifying information to identify the one or more of the plurality of users, and (b) engagement information regarding the interaction of the one or more of the plurality of users with the spliced entertainment content displayed on the display device, the engagement information for each user comprising user responses to the inquiries provided by the each user via the at least one of the plurality of user electronic devices;
      analyzes the collected user information;
      determines whether the engagement information for the each user includes an answer to the inquiries;
      evaluates whether the engagement information for the each user reflects a particular relation to the spliced entertainment content; and
      outputs a notification to the each user of a result of the evaluation for display on a display device of the each of the plurality of user electronic devices by which the each of the one or more of the plurality of users communicates with the user data collection device.

2. The system of claim 1, wherein the user data collection device is further configured to aggregate the result of the evaluation for a plurality the inquiries to produce an overall objective evaluation of attention of the each user to the spliced entertainment content.

3. The system of claim 2, the output compilation of the collected user information comprising the overall objective evaluation of the attention of the each user to the spliced entertainment content for the at least some of the plurality of users.

4. The system of claim 3, wherein:
   the identifying information for the each user includes demographic information for the each user; and
   the output compilation of the collected user information matches the overall objective evaluation of the attention of the each user to the spliced entertainment content to the demographic information for the each user of the at least some of the plurality of users.

5. The system of claim 1, the inserted additional content including selected advertising content.

6. The system of claim 1, the inserted additional content including at least one of an aural and a visual alert to direct the each user's attention to particular portions of the spliced entertainment content.

7. A method for analyzing and reporting user engagement with entertainment content, comprising:
   generating, with a processor, spliced entertainment content by:
      recovering archived entertainment content stored in a storage device;
      parsing portions of the archived entertainment content into a plurality of individual segments;
      reordering at least some of the plurality of segments in a second order that differs from a first order in which the at least some of the plurality of segments were presented in the archived entertainment content; and
      inserting additional content into the second order of the at least some of the plurality of individual segments;

establishing communication between the processor and a display device;

communicating the spliced entertainment content from the processor to the display device;

displaying the spliced entertainment content on the display device;

establish communication between the processor and a plurality of user electronic devices by which one or more of the plurality of users communicates with the processor to facilitate user interaction with the processor for user data collection;

generating, with the processor, inquiries related to the spliced entertainment content;

communicating the generated inquiries to the at least some of the plurality of user electronic devices;

collecting, with the processor, user information comprising (a) identifying information to identify the one or more of the plurality of users, and (b) engagement information regarding the interaction of the one or more of the plurality of users with the spliced entertainment content displayed on the display device, the engagement information for each user comprising user responses to the inquiries provided by the each user via the at least one of the plurality of user electronic devices;

analyzing, with the processor, the collected user information;

determining, with the processor, whether the engagement information for the each user includes an answer to the inquiries;

evaluating, with the processor, whether the engagement information for the each user reflects a particular relation to the spliced entertainment content; and outputting, from the processor, a notification to the each user of a result of the evaluation for display on a display device of the each of the plurality of user electronic devices by which the each of the one or more of the plurality of users communicates with the user data collection device.

8. The method of claim 7, further comprising aggregating the result of the evaluation for a plurality of inquiries to produce an overall objective evaluation of attention of the each user to the spliced entertainment content.

9. The method of claim 8, the output compilation of the collected user information comprising the overall objective evaluation of the attention of the each user to the spliced entertainment content for the at least some of the plurality of users.

10. The method of claim 9, wherein:

the identifying information for the each user includes demographic information for the each user; and the output compilation of the collected user information matches the overall objective evaluation of the attention of the each user to the spliced entertainment content to the demographic information for the each user of the at least some of the plurality of users.

11. The method of claim 7, the inserted additional content including selected advertising content.

12. The method of claim 7, the inserted additional content including at least one of an aural and a visual alert to direct the each user's attention to particular portions of the spliced entertainment content.

* * * * *